Figure 3:
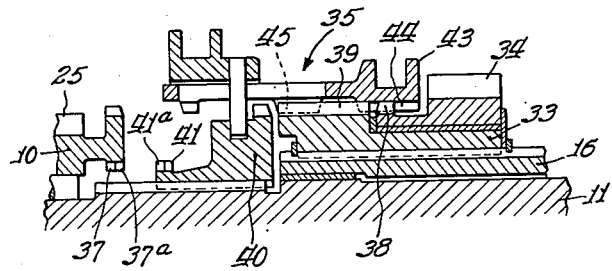

April 8, 1952     B. A. SWENNES     2,592,210
TRANSMISSION
Filed Aug. 1, 1945     3 Sheets-Sheet 1
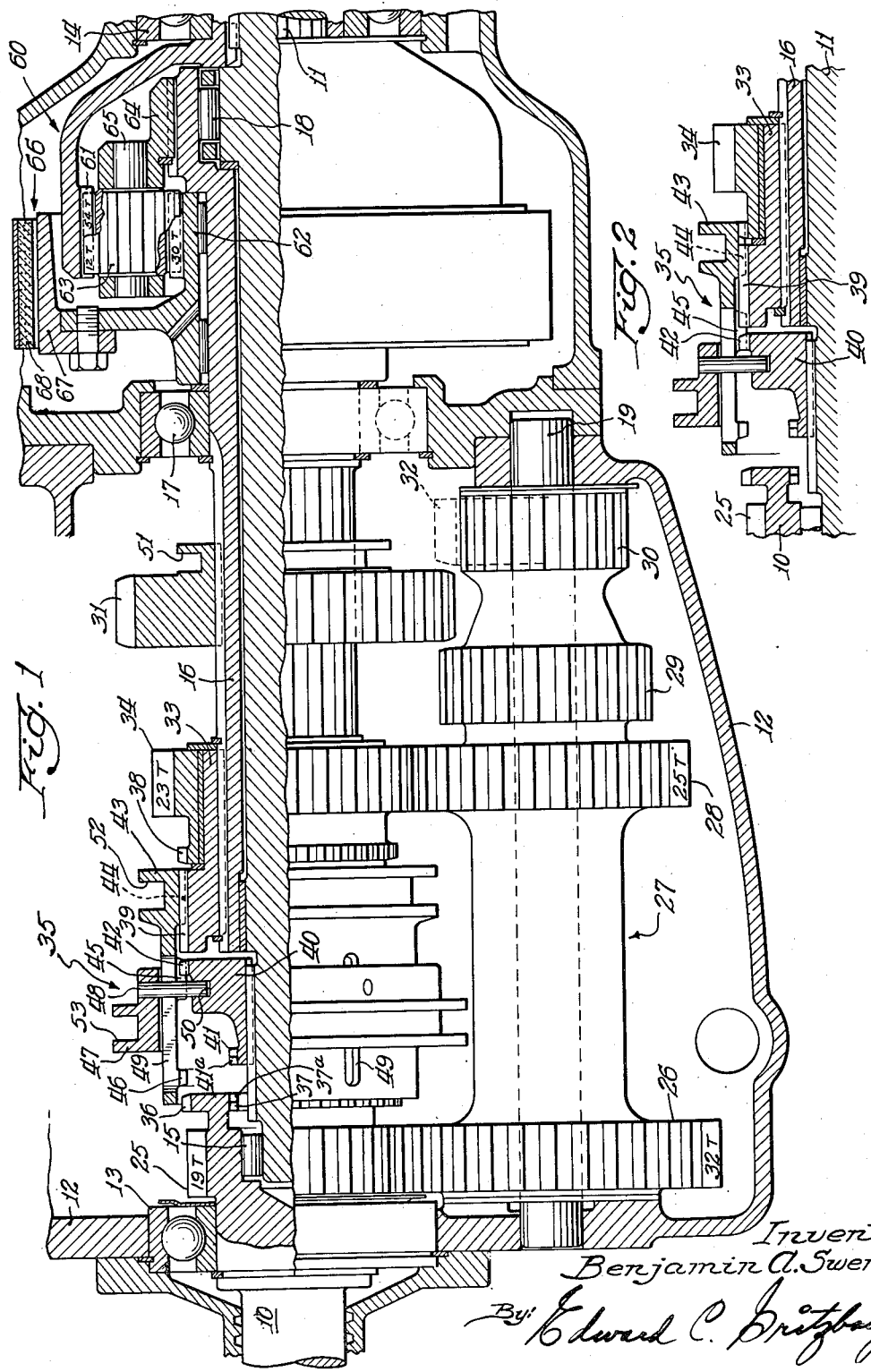
Inventor:
Benjamin A. Swennes Inventor:
Benjamin A. Swennes April 8, 1952  B. A. SWENNES  2,592,210
TRANSMISSION
Filed Aug. 1, 1945  3 Sheets-Sheet 3
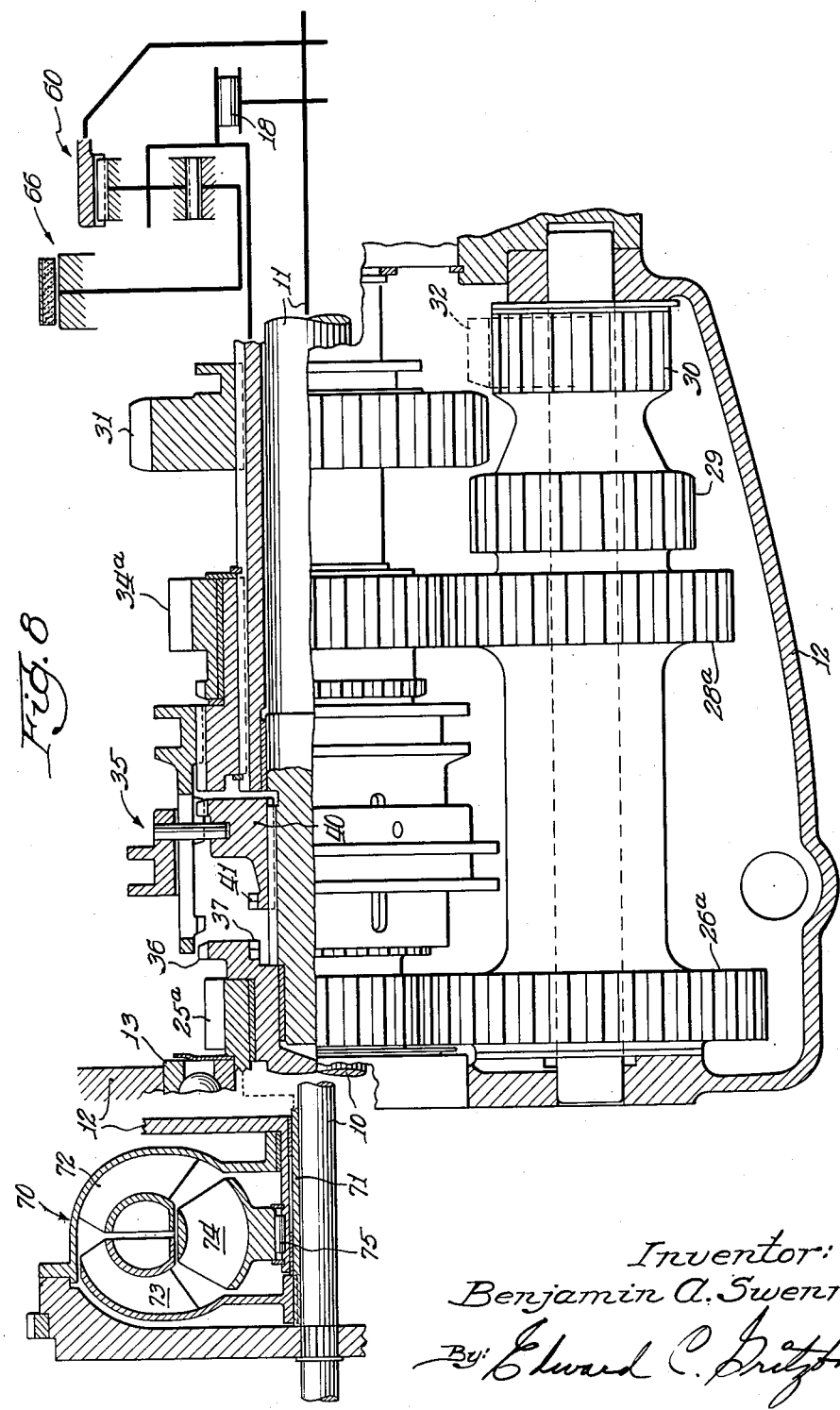
Inventor:
Benjamin A. Swennes
By: Edward C. Fitzhugh
Atty.

Patented Apr. 8, 1952

2,592,210

UNITED STATES PATENT OFFICE 2,592,210

TRANSMISSION

Benjamin A. Swennes, Rockford, Ill., assignor to Borg-Warner Corporation, Chicago, Ill., a corporation of Illinois Application August 1, 1945, Serial No. 608,255

28 Claims. (Cl. 74—740)

My invention relates to transmissions and more particularly to transmissions adapted for use on motor vehicles.

It is an object of my invention to provide an improved power shifted transmission and an improved method for changing speed ratios between drive and driven shafts by means of power shifting. By power shifting I mean a shifting into another and particularly into a higher speed ratio by an engagement of a device, such as friction engaging means, which allows substantial relative rotation between the parts to be coupled thereby until a relatively complete engagement is effected.

Power shifted transmissions have heretofore been proposed. Each of these previous transmissions for each change in speed ratio to be attained by power shifting has included friction engaging means to be engaged for completing the power shift. It is an object of my invention to provide an improved power shifted transmission and method for power shifting in which only a single friction engaging means or its equivalent is required for a plurality of power shifts. It is contemplated that the single friction engaging means shall first be engaged to power shift from a low speed ratio to a higher speed ratio, the transmission shall after a completion of such shift be driven through another power train not including the friction engaging means whereby the friction engaging means may be disengaged, and then the friction engaging means may be again engaged to perform another power shift to a still higher speed ratio.

It is still another object of my invention to provide an improved arrangement of gear trains in a transmission whereby after the transmission has been shifted from a low to a higher speed ratio by a power shifting procedure, the driven shaft is driven through the higher speed power train at substantially the same speed as the drive shaft, whereby a positive clutch may be utilized for directly connecting the drive and driven shafts, the positive clutch providing a power train between the shafts which is in parallel with the power train provided by engagement of a friction engaging means or its equivalent. It is more specifically an object of the invention to provide an underdrive gear train and an overdrive gear train, the underdrive gear train being adapted to provide the low speed ratio between the drive and driven shafts and the overdrive gear train being connectible, by an engagement of a friction engaging means, in tandem with the underdrive gear train to provide the higher speed ratio between the shafts at which the positive clutch may be engaged. It is contemplated the underdrive gear train and the overdrive gear train shall provide substantially the same changes in speed ratio whereby the driven shaft is driven at the same speed as the drive shaft to facilitate an engagement of the positive clutch with substantially no clash of the positive clutch. As a practical matter, in order to promote an easy engagement of the positive clutch, it is deemed preferable to provide just a slight difference in speed ratio between the underdrive gear train and the overdrive gear train so that there is a slight relative rotation between the engaging parts of the positive clutch when the driven shaft is being driven at the said higher speed ratio, so that a buttended condition of the engaging parts of the positive clutch cannot occur.

It is also an object of the invention to provide positive clutch means for connecting the overdrive gearing mentioned above with the drive shaft as the driven shaft is being driven through the positive clutch directly between the shafts, whereby, in order to power shift into a still higher or overdrive ratio, the same friction engaging means that was used to power shift into the intermediate speed ratio or direct drive is engaged to power shift into the overdrive speed ratio.

It is not necessary that the low and the high power trains, above referred to, be entirely of the gearing type, and it is an object of the invention to provide a modified form of the invention in which the low speed power train includes a hydrodynamic coupling device therein to provide for an extremely easy starting of the vehicle in which the transmission is installed.

My invention consists of the novel constructions, arrangements, devices and methods to be hereinafter described and claimed for carrying out the above stated objects and such other objects as will appear from a description of certain preferred embodiments of the invention illustrated in the accompanying drawings, wherein:

Fig. 1 is a longitudinal, sectional view of a transmission embodying the principles of the invention;

Figs. 2 to 7 are longitudinal sectional views of certain clutch mechanism which forms a part of the transmission illustrated in Fig. 1, the mechanism being shown in the various views in different clutching conditions as will be hereinafter more fully described; and Fig. 8 is a longitudinal, sectional view of a modified form of the invention, with certain parts of the transmission being shown diagrammatically.

Like characters of reference designate like parts in the several views.

The transmission illustrated in Fig. 1 comprises a drive shaft 10 and a driven shaft 11. The shaft 10 is adapted to be connected with and be driven by the engine of an automotive vehicle, and the shaft 11 is adapted to be connected with the driving wheels of the vehicle for propelling the vehicles. The shaft 10 may be connected with the engine through an ordinary friction clutch (not shown) if desired, in accordance with common practice. The shafts 10 and 11 are rotatably disposed within a transmission housing 12 by means of bearings 13 and 14, respectively, and the shaft 11 is piloted in the shaft 10 by means of bearing rollers 15, as shown. A hollow shaft 16 is rotatably disposed on the shaft 11 and is rotatably disposed in the housing 12 by means of a bearing 17. The shaft 16 is drivingly connected with the shaft 11 by means of a one-way clutch 18. The one-way clutch 18 may be of the ordinary roller type and is such that the shaft 16 may be effective to drive the shaft 11 in the forward direction, that is, in the direction for propelling the vehicle in the forward direction, but the roller clutch cannot drive the shaft 11 in the opposite direction. A countershaft 19 is disposed in the transmission casing 12 in spaced relation with the shafts 10 and 11, as shown.

The drive shaft 10 is formed with a gear 25 which is in mesh with a gear 26 on the countershaft 19. The gear 26 is one of the gears of a gear cluster 27 rotatably disposed on the countershaft, the other gears being the gears 28, 29 and 30. A gear 31 is slidably splined on the hollow shaft 16 and is movable into mesh with the gear 29 to thereby complete a low speed power train as will be hereinafter described. An idler gear 32, rotatably held by any suitable means with respect to the transmission casing 12, is in mesh with the gear 30, and the gear 31 is also adapted to be moved into mesh with the idler gear 32 so as to complete a reverse drive train as will be hereinafter more fully described. A sleeve 33 is splined on the shaft 16, and a gear 34 is rotatably disposed on the sleeve. The gear 34 is in mesh with the gear 28 and is part of the second speed power train of the transmission as will be described.

A clutch mechanism 35 is provided for connecting the shafts 10, 16 and 11 and the gear 34 with each other in certain combinations for controlling the transmission. This clutch mechanism comprises clutch teeth 36 and 37 formed on the drive shaft 10, clutch teeth 38 formed on the gear 34, and splines 39 formed on the clutch sleeve 33. A clutch member 40 having clutch teeth 41 and 42 is splined on the shaft 11 so as to be slidable thereon. The clutch teeth 41 are adapted to mesh with the clutch teeth 37 on the drive shaft 10 for purposes to be hereinafter described.

A clutch sleeve 43 is slidably disposed over the clutch sleeve 33. The clutch sleeve 43 on its inner surface is provided with clutch teeth 44, 45 and 46 which are spaced from each other and are of such relative length as shown. The teeth 46 are adapted to engage with the teeth 36; the teeth 45 are adapted to mesh with the splines 39 and the teeth 42; and the teeth 44 are adapted to mesh with the teeth 38 and the splines 39, all for purposes hereinafter to be described.

A ring 47 is slidably disposed on the clutch sleeve 43. Pins 48 are fixed in the ring 47 and extend through slots 49 in the clutch sleeve 43 and into an annular groove 50 in the clutch member 40 for shifting the latter member. The gear 31, the clutch sleeve 43 and the ring 47 are shiftable for controlling the transmission and they are respectively provided with annular grooves 51, 52 and 53 in which suitable shifting forks (not shown) may fit for shifting these parts.

A planetary overdrive unit 60 is provided, for at times driving the driven shaft 11. The overdrive unit comprises a ring gear 61 splined to the driven shaft 11, a sun gear 62 rotatably disposed on the shaft 16, planet gears 63 in mesh both with the ring gear 61 and with the sun gear 62 and a planet gear carrier element 64 splined to the shaft 16. The carrier element 64 comprises stub shafts 65, and the planet gears 63 are rotatably disposed on these shafts. The overdrive unit is controlled by means of a friction brake 66 for the sun gear 62 which comprises a brake drum 67 and a brake band 68. The band 68 may be controlled by any suitable means, and as will be readily understood, the brake 66 may be engaged as quickly or as slowly as desired, allowing as little or as much slip between the band 68 and drum 67 as desired.

The gears 25, 26, 28 and 34 constitute the second speed drive gears of the transmission, and these gears constitute an underdrive gear set wherein the gear 34 is rotated at a less speed than the drive shaft 10 and the gear 25 formed thereon. Just as an example of the sizes that these gears may be, the number of teeth that each of these gears may have is given in the drawings, the gear 25 having 19 teeth, the gear 26 having 32 teeth, the gear 28 having 25 teeth and the gear 34 having 23 teeth. With the gears having this number of teeth, the reduction ratio of this gear set is 1.549 to 1; that is, the shaft 10 rotates 1.549 times for every one revolution of the gear 34. Just as an example, I have also given the gear sizes of the gears in the planetary gear unit 60 that may be used, the ring gear 61 having 54 teeth, the sun gear 62 having 30 teeth, and the planet gears 63 having 12 teeth. With the gears of the unit 60 having the indicated number of teeth, the unit 60, when the shaft 16 is used as the driving element of the gear set and the ring gear 61 is used as the driven element, will have an overdrive speed ratio of 1 to 1.555, that is, the ring gear will rotate 1.555 times for each revolution of the shaft 16. It will be observed that the number of teeth on the gears in the underdrive gear set and the overdrive gear set have been so proportioned that the speed ratio obtained through both of the gear sets is substantially the same, it being understood, of course, that the driven member (34) of the underdrive gear set is driven at a lower speed than the drive element (10) thereof while the driven element (61) of the overdrive unit 60 is driven at a greater speed than the driving element (16) of the gear set. It will be understood further that many other different sizes of gears may be used in lieu of the particular sizes given herein, it being simply the purpose to design the underdrive gear set to provide a ratio in underdrive which differs by only a small amount from and which is substantially the same as the ratio the overdrive gear set provides in overdrive, for purposes hereinafter to be described.

In the operation of the illustrated transmission, the shiftable clutch members 40 and 43 and the gear 31 are put in the positions in which they are illustrated in Fig. 1 to provide a neutral condition in the transmission. In these positions of the members 40 and 43, the teeth 44 of the clutch sleeve 43 are engaged with the splines 39 and the clutch teeth 45 on the sleeve are engaged with the teeth 42 on the member 40. The shiftable members 43 and 40 in these positions thus function to connect the sleeve 33, and thereby the shaft 16 to which the sleeve is fixed, through the members 40 and 43 with the driven shaft 11. The gear 31 is capable of providing a driving connection between the shafts 10 and 16, but in its illustrated position it is out of mesh with the driving gears 29 and 32 and thus is not driven. There are also no other completed power trains between the shaft 10 and either the shaft 11 or the shaft 16, and the transmission is in neutral.

For low speed forward drive, the gear 31 is shifted to the left as seen in Fig. 1 to bring it into mesh with the gear 29, and the clutch mechanism 35 is allowed to remain in the condition in which it is illustrated in this figure. The drive is then from the drive shaft 10 through the gears 25 and 26 to the cluster gear 27, thence through the gears 29 and 31 to the shaft 16, and thence through the parts 33, 43 and 40 to the driven shaft 11. For reverse drive, the gear 31 is shifted to the right as seen in the figure to engage it with the idler gear 32, and the drive in reverse is the same as in low speed forward drive with the exception that it proceeds through the gears 30 and 32 instead of the gear 29.

For second speed forward drive, the clutch mechanism 35 is put into the condition in which it is shown in Fig. 3, with the clutch sleeve 43 being shifted to the right to engage its teeth 45 with the splines 39 and to engage its teeth 44 with the teeth 38. An underdrive gear train comprising the gears 25, 26, 28 and 34 is then operative and the drive is from the drive shaft 10 through the gears 25 and 26, the gear cluster 27, the gears 28 and 34, the clutch teeth 38 and 44 to the sleeve 33 and thence through the shaft 16 and the roller clutch 18 to the driven shaft 11.

The transmission may be power shifted from second speed to third speed forward drive simply by an engagement of the friction brake 66. The engagement of this brake renders the overdrive gear unit 60 operative, and the drive from the shaft 16 instead of proceeding through the roller clutch 18 is through the overdrive gear unit 60, it being understood that the movable clutch elements 43 and 40 are allowed to remain in their Fig. 3 positions. The shaft 16 drives the planet gear carrier 64, and the ring gear 61 and thereby the driven shaft 11 are driven at an over-speed with respect to the shaft 16. The sun gear 62 functions as the reaction element of the planetary gearing, and as will be understood, the roller clutch 18 over-runs. Since it is the engagement of the friction brake 66 that brings the overdrive gear set 60 into operation, it will be understood that the shift from second to third speed may be made as gradually and gently as desired. It will be understood from an analysis of the drive in this speed ratio that the overdrive gear set comprising the gears 61, 62 and 63 is connected in tandem or in series with the underdrive gear set comprising the gears 25, 26, 28 and 34, and the drive in this speed ratio is thus made up of the drive through both of the gear sets. In view of the fact that the ratio of underdrive in the underdrive gear set is substantially the same as the ratio of overdrive in the overdrive gear set, the shaft 11 is thus driven at substantially a one to one ratio or at the same speed as the drive shaft 10.

Figure 4:
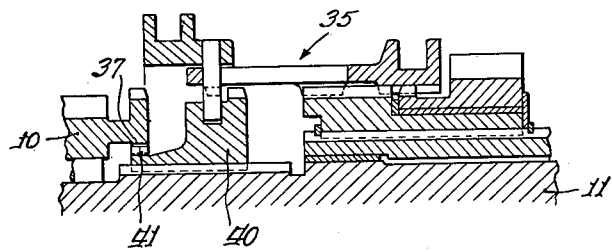

The same friction brake 66 which is utilized for power shifting into third speed is also utilized for power shifting into fourth speed or overdrive without a break in the drive between the shafts 10 and 11. For this to be done, however, the overdrive gear unit 60 must be demobilized and the drive between the shafts 10 and 11 must be taken by other mechanism. The clutch element 40 functions to provide this other power train between the shafts 10 and 11, and for this purpose the clutch element is shifted to its position as shown in Fig. 4 in which its teeth 41 engage with the teeth 37 to directly connect the shafts 10 and 11. This engagement is made while the shaft 11 is being driven through the underdrive and overdrive gear sets in third speed as above described, and engagement of the teeth 41 and 37 may be made without clash due to the fact that the shafts 10 and 11 are rotating at substantially the same speed through the underdrive and overdrive gear sets. As soon as the engagement of these teeth is completed, the brake 66 is disengaged to demobilize the overdrive gear set, and the drive between the shafts 10 and 11 proceeds through the teeth 37 and 41 and the clutch element 40 in direct drive. With this condition existing, the clutch 18 overruns, and the underdrive gear set also does not drive. In order for this easy engagement of the clutch teeth 41 and 37 to take place, the shafts 10 and 11 must be rotating at substantially the same speed. My invention contemplates that the shafts may be made to rotate at exactly the same speed; however, I deem it preferable to provide a slight difference in speed, such as provided by the illustrated underdrive and overdrive gear sets which differ slightly in speed ratio, so that the shafts 10 and 11 and thereby the clutch teeth 37 and 41 rotate slightly with respect to each other when the shaft 11 is driven in third speed drive through the underdrive and overdrive gear sets. The clutch teeth 37 and 41 cannot thus remain in a butt ended condition prior to engagement which would hinder their engagement. These teeth are also provided with chamfered ends 37a and 41a to facilitate their engagement.

Figure 5:
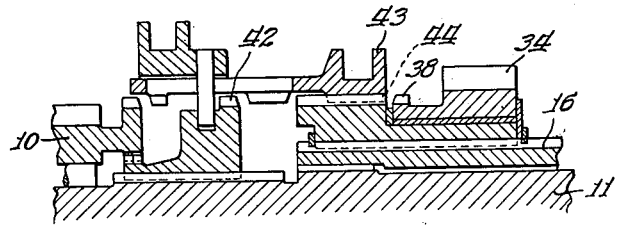
Figure 6:
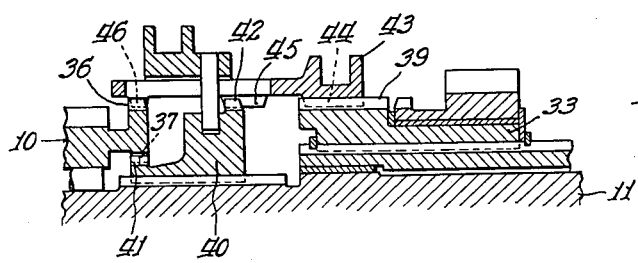
Figure 7:
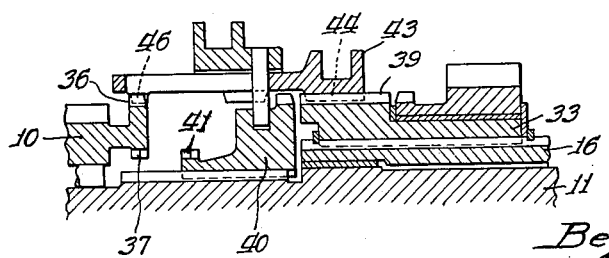

In order to shift the transmission into its fourth or overdrive speed, the clutch sleeve 43 is first shifted into its Fig. 5 position to move its teeth 44 out of mesh with the teeth 38 of the gear 34. There is no drive through the countershaft gearing and this shift may be easily made. The shaft 16 is then not driven; however, due to its frictional engagement with the shaft 11 extending therethrough, it tends to rotate at the same speed as the shaft 11. Upon this increase of speed of the shaft 16 and thus of the clutch sleeve 43, the sleeve is shifted further to the left to bring it into its Fig. 6 position and to engage its teeth 45 with the teeth 42 of the clutch element 40 and to engage its teeth 46 with the teeth 36 of the drive shaft 10. This shifting of the clutch sleeve 43 completes another potential power train between the shafts 10 and 11 which is through the clutch teeth 36 and 46, the clutch sleeve 43, the clutch teeth 44 and splines 39, the sleeve 33, shaft 16 and roller clutch 18 to the driven shaft 11; however, since the teeth 41 of the clutch element 40 and the teeth 37 are engaged, the former power train does not act to drive. In order to shift to overdrive speed ratio, the friction brake 66 is engaged. The brake is engaged slightly at first to relieve the driving torque on the clutch teeth 41 and 37, and the clutch element 40 is then shifted to its position in which it is shown in Fig. 7 to break the power train through the clutch teeth 37 and 41. Engagement of the brake 66 is then completed and the shaft 11 is driven at overdrive speed. The drive in this speed ratio is from the drive shaft 10, through the clutch teeth 36 and 46, the clutch sleeve 43, the clutch teeth 44 and splines 39, the sleeve 33, the shaft 16 and the overdrive gear set 60 to the driven shaft 11.

It is apparent that the same friction brake 66, which is used for making a power shift from second speed to third speed is also utilized for making a power shift to fourth speed without a discontinuance of drive between the shafts 10 and 11. The power shifting mechanism, namely the overdrive gear unit 60 together with its brake 66, is demobilized at the end of the first power shift from second to third speed, while the power train is completed between the drive and driven shafts by other mechanism, namely the clutch teeth 37 and 41. Due to the fact that the underdrive gear set provides substantially the same change in speed ratio as does the overdrive gear set 60, the teeth 37 and 41 are substantially synchronized and may be easily engaged to provide this alternate power train between the shafts 10 and 11 in direct drive. The driving element of the planetary gear unit 60, which is the shaft 16, is then disconnected from the underdrive gear set and is directly connected with the drive shaft 10 through the clutch teeth 36 and 46, so that the overdrive gear unit 60 is then available to power shift the transmission into overdrive or fourth speed drive.

As has been described, the drive in second speed, with the clutch elements 40 and 43 being in their Fig. 3 positions, is through the roller clutch 18, and this thus is an overrunning drive. If it is desired to provide a positive drive in second speed, as is desirable at times for utilizing the motor as a braking means, as when descending a grade or mountain, the clutch elements may be shifted to their Fig. 2 positions. In Fig. 2, the clutch sleeve 43 is shifted to interengage its teeth 45 both with the splines 39 and with the teeth 42 of the clutch element 40, and the drive in second speed ratio instead of being from the gear 34 through the clutch sleeve 33 and the shaft 16 is directly from the clutch sleeve 43 to the shaft 11 through the clutch element 40 with the teeth 42 and 44 providing a positive connection in lieu of the one-way connection through the roller clutch 18.

The modified form of the invention shown in Fig. 8 is substantially the same as that shown in Figs. 1 to 7 with the exception that a hydraulic torque converter 70 is connected between the underdrive gear train and the drive shaft 10. It is also contemplated that the underdrive gearing itself shall provide a slightly higher speed ratio than does the underdrive gearing in the transmission illustrated in Fig. 1. As will be noted from an examination of Fig. 8, the clutch teeth 36 and 37 are formed directly on the drive shaft 10; however, the gear 25a corresponding to the gear 25 in the Fig. 1 construction is rotatably mounted on the drive shaft 10 and is connected by a hollow shaft 71 with the torque converter 70. The torque converter may be of any suitable construction and comprises an impeller element 72, a runner element 73 and a stator element 74. The impeller element 72 is connected to be driven by the drive shaft 10; the runner element 73 is connected with the gear 25a by the shaft 71 and the stator element 74 is connected to any stationary member, such as a portion of the transmission casing 12, through a one-way brake 75. All three of the elements 72, 73 and 74 are disposed in the same fluid housing, and the elements are coupled together by means of fluid in the housing. Upon rotation of the drive shaft 10 and the impeller 72, the runner element 73 is driven; and at the start of operation of the converter 70, due to the action of the stator 74 which is held stationary by means of the brake 75, the runner element is driven at increased torque. After the speed of the runner 73 has increased to a predetermined speed, depending upon the amount of torque being transmitted through the fluid device 70, the one-way brake 75 will begin to overrun, and the hydraulic device 70 thereafter functions as a simple fluid coupling. The torque converter 70 may be of any suitable well known construction and may, for example, be similar to the constructions shown in Schneider Patents No. 2,306,758 and No. 2,333,680.

Due to the fact that even at high speeds of the torque converter 70, there is a certain amount of slip between the impeller 72 and runner 73 so that the gear 25a rotates at a slightly less speed than the shaft 10, it is necessary that the underdrive gearing connected in tandem with the torque converter be such that the driven gear 34a of the gearing be driven at a higher speed ratio with respect to the drive gear 25a thereof than is the driven gear 34 with respect to the drive gear 25 in the Fig. 1 construction. This is necessary so that the driven shaft 11 and thereby the clutch element 40 and its teeth 41 may be brought up to the same speed as the clutch teeth 37 in order to couple the teeth 41 and 37 after the brake 66 has been engaged to put the transmission in third speed regardless of the slip in the fluid device 70 and to compensate for this slip. The gears in the underdrive gear train in the Fig. 8 embodiment are thus of slightly different sizes than those in the Fig. 1 embodiment and are designated by the reference numerals 25a, 26a, 28a and 34a, with these gears corresponding to the gears 25, 26, 28 and 34 in the Fig. 1 embodiment.

Due to the fact that the hydrodynamic torque converter 70 in itself multiplies torque, it will rarely be necessary to use the low speed gears 29 and 31, and if desired the gear 29 may be eliminated entirely to dispense with the low speed drive ratio. The gears 30 and 32 together with the gear 31 are preferably retained in order to provide a reverse drive through the transmission. Due to the torque multiplying characteristics of the converter 70, it may be desirable to make the gears 30, 31 and 32 of different sizes than in the Fig. 1 embodiment, as will be understood.

The Fig. 8 embodiment is shifted and operates in substantially the same manner as the Fig. 1 embodiment of the invention. If the gear 29 is provided, the gear 31 is moved into engagement therewith to provide a low speed forward drive which is the same as in the Fig. 1 embodiment with the exception that the drive proceeds through the torque converter in tandem with the underdrive gear set, and a reverse drive by shifting the gear 31 into engagement with the gear 32 may be obtained, this drive being similar to the corresponding drive in the Fig. 1 embodiment except that it also proceeds through the torque converter 70. For power shifting, the clutch mechanism 35 is conditioned as shown in Fig. 3, and a second speed drive is then operative which proceeds in the same manner as in the Fig. 1 embodiment except that it is through the torque converter 70. The transmission is power shifted to third speed by an engagement of the friction brake 66, and this drive, as will be understood, is also through the torque converter 70. Due to the increased speed ratio provided by the underdrive gearing itself, comprising the gears 25a, 26a, 28a and 34a, the speed of the driven shaft 11 is raised at least to the speed of the drive shaft 10 to allow engagement of the clutch teeth 37 and 41. The underdrive gear train is preferably such that the driven shaft 11 will be so raised in speed by an engagement of the friction brake 66 that the shaft 11 rotates at the same speed as the shaft 10 when there is a heavy load on the shaft 11 and the slip through the torque converter 70 is relatively high. At light loads on the shaft 11, the engagement of the brake 66 will tend to raise the speed of the shaft 11 slightly higher than the speed of the shaft 10; however, since there is a crossing of the speeds of the shafts 10 and 11, the clutch teeth 37 and 41 may be engaged at such crossing of the speeds to directly couple the shafts 10 and 11. It is contemplated that the friction brake 66 shall be disengaged promptly after the engagement of the teeth 37 and 41 so that there will be no unnecessary power lost either in the coupling 70 or in the brake 66. The shift from direct drive through the clutch teeth 37 and 41 to fourth speed or overdrive is accomplished in the same manner as in the Fig. 1 embodiment of the invention, and the power train through the transmission in overdrive is the same as in the Fig. 1 embodiment.

My improved transmission advantageously provides a power shifting into a plurality of speed ratios with use of only a single friction engaging means, the friction engaging means being disengaged after having been engaged for the first power shift and being used for the second power shift by again being engaged. I thus provide a relatively simple power shifted transmission.

I wish it to be understood that my invention is not to be limited to the specific constructions, arrangements, devices and methods illustrated in or in connection with the accompanying drawings, except only insofar as the claims may be so limited, as it will be apparent to those skilled in the art that changes may be made without departing from the principles of the invention. In particular, I wish it to be understood that where in my claims I call for a friction engaging means, I mean to include by such terminology not only a friction clutch, in which a movable part is coupled to another movable part, but I also intend to include by such terminology a friction brake, in which a movable part is coupled to a stationary part for the purpose of stopping or retarding rotation of the movable part; also reference to a positive engaging means is to be interpreted as including either a positive clutch or brake or any structure having relatively rotatable parts capable of dental engagement; and, in addition, where I call for an engaging means, I mean to include the devices coming within the herein previously defined friction engaging means or positive engaging means unless its operation, as defined in the claims, indicates its character.

I claim:

1. In a transmission, the combination of a drive shaft, a driven shaft, means for providing a power train between said shafts and including a positive clutch for conditioning the power train for operation and a friction engaging means for completing the power train, means for providing another power train between said shafts and including a positive clutch and not including said friction engaging means, means for providing a third power train between said shafts, said last-named power train including a positive clutch for conditioning the power train for operation and including said friction engaging means for completing the power train, and one-way engaging means operative in said second power train and rendered inoperative during completion of said third power train when said friction engaging means is engaged whereby the third power train may be completed while the second power train is operative, the positive clutch in said second power train being engageable while the first power train is operative.

2. In a transmission; the combination of a drive shaft; a driven shaft; means for providing a power train between said shafts and including an engaging means for completing the power train; said engaging means being of a type providing an initial slip between the parts to be engaged; and means for providing another power train between said shafts and including a positive type engaging means for completing the power train; said two power trains providing substantially the same speed ratio between said shafts whereby while said first-named power train is operative to drive the driven shaft, the positive type engaging means may be engaged to render said second-named power train operative.

3. In a transmission; the combination of a drive shaft; a driven shaft; means for providing a power train between said shafts and including a friction engaging means for completing the power train; and means for providing another power train between said shafts and including a positive engaging means for completing the power train; said two power trains providing speed ratios between said shafts which differ only slightly whereby while said first-named power train is operative to drive the driven shaft, the positive engaging means may be engaged to render said second-named power train operative with substantially no clash of the meshing parts of the positive engaging means.

4. In a transmission, the combination of a drive shaft, a driven shaft, means for providing a power train between said shafts, means for providing a second power train between said shafts of a different ratio than said first named power train, said second power train including a friction engaging means for completing the power train and being adapted to be rendered operable while said first named power train is operative whereby to shift from one speed ratio to the other, and means for providing a third power train between said shafts and including a positive engaging means for completing the power train, said second and third power trains providing substantially the same ratio between said shafts whereby while said second power train is operative to drive the driven shaft, the positive engaging means may be engaged to render said third power train operative.

5. In a transmission; the combination of a drive shaft; a driven shaft; means for providing a power train between said shafts; means connectible in tandem with said first-named means for providing another power train of different speed ratio between said shafts and including a friction engaging means for completing the power train; and means for providing a third power train between said shafts and including a positive engaging means for completing the power train; at least two of said three named means including gearing and said gearing being such that said second and third-named power trains provide substantially the same speed ratio between said shafts whereby while said second-named power train is operative to drive the driven shaft, the positive engaging means may be engaged to render said first-named power train operative.

6. In a transmission, the combination of a drive shaft, a driven shaft, means including gearing for providing a low-speed power train between said shafts, a power train providing means including overdrive gearing connectible in tandem with said first-named gearing for providing a high speed ratio between said shafts, said second-named means including a friction engaging means for rendering the second-named means operative, and a third means for providing a third power train between said shafts and including a positive engaging means for rendering the third means operative, said third means being adapted to drive said driven shaft at substantially the same speed ratio as said second-named means whereby said positive engaging means may be engaged without substantial clash between the meshing parts of the engaging means while the driven shaft is driven by the overdrive gearing at said high speed ratio.

7. In a transmission, the combination of a drive shaft, a driven shaft, underdrive gearing for driving said driven shaft at a low speed ratio, overdrive gearing connectible in tandem with said underdrive gearing for driving said driven shaft at a high speed ratio, said overdrive gearing including a friction engaging means for rendering the gearing effective, said underdrive gearing and said overdrive gearing providing substantially the same speed ratios whereby the driven shaft is driven at substantially the same speed by said overdrive gearing connected with the underdrive gearing as the speed of said drive shaft, and a positive engaging means for connecting together said driving and driven shafts while the driven shaft is driven by the overdrive gearings at said high speed ratio.

8. In a transmission, the combination of a drive shaft, a driven shaft, underdrive gearing for providing a power train between said shafts and connected with the driven shaft by means of a one-way clutch, planetary overdrive gearing connectible in tandem with said underdrive gearing and in parallel with said one-way clutch for driving said driven shaft at a high speed ratio and including a friction brake for rendering the planetary gearing so effective, and a positive clutch for connecting directly said driving and driven shafts, said underdrive gearing and said overdrive gearing providing speed ratios which differ only slightly whereby the positive clutch may be engaged with substantially no clash between the meshing parts thereof when the driven shaft is driven at said high speed ratio through said overdrive gearing.

9. In a transmission, the combination of a drive shaft, a driven shaft, means providing a power train between said shafts and including a friction engaging means for completing the power train, means providing another power train between said shafts and including a positive engaging means for completing the power train, said last-named power train being of substantially the same ratio as said first-named power train whereby the positive engaging means may be engaged while the first-named power train is operative, and means providing a third power train between said shafts which includes said friction engaging means and which is completed by an engagement of the friction engaging means, said last-named power train being of a different ratio than said first two named power trains.

10. In a transmission, the combination of a driving shaft, a driven shaft, means providing a power train between said shafts, said means including overdrive gearing and a friction engaging means for rendering the gearing operative and for completing the power train, means providing another power train between said shafts and including a positive engaging means, said two power trains being of substantially the same ratio whereby the positive engaging means may be engaged to complete said second named power train while said first-named power train is operative, and means providing a third power train between said shafts providing a different speed ratio than said other power trains, said last named means including said gearing and said friction engaging means which is engaged to complete said third power train.

11. In a transmission, the combination of a drive shaft, a driven shaft, means providing a power train between said shafts and including a positive clutch and an overdrive gear set, said gear set including a friction engaging means which is engaged to complete said power train after said positive clutch has previously been engaged, means providing another power train between said shafts and including a positive clutch engageable during operation of said first power train, said two power trains being of substantially the same ratio, and means providing a third power train between said shafts and including a positive clutch and said gear set, said last-named power train being of higher speed ratio than said first two-named power trains and being completed by an engagement of said friction engaging means after said last-named positive clutch has previously been engaged.

12. In a transmission, the combination of a drive shaft, a driven shaft, means providing a power train between said shafts and including an overdrive gear set, said gear set comprising a friction engaging means for rendering the gear set operative and for completing said power train, means for providing another power train between said shafts and including a positive engaging means for completing the power train, said two power trains being of only slightly different ratio and the positive engaging means being engageable to complete said second-named power train while said friction-engaging means is engaged to render the first-named power train operative, and means providing a third power train between said shafts and including said overdrive gear set, said third power train being of a substantially higher ratio than said first two-named power trains and being completed by and engagement of said friction engaging means.

13. In a transmission, the combination of a drive shaft, a driven shaft, means providing a low ratio power train between said shafts, means providing an intermediate speed ratio power train between said shafts and including a friction engaging means for completing the power train, means providing a power train between said shafts which includes a positive type engaging means for completing the power train, said last-named power train being of substantially the same speed ratio as said intermediate speed power train and said positive engaging means being engageable when said intermediate speed power train is operative, and means providing a high speed power train between said shafts including said friction engaging means which is engaged to complete the power train.

14. In a transmission, the combination of a drive shaft, a driven shaft, means providing a low speed power train between said shafts, means providing an intermediate speed power train between said shafts and including an overdrive gear set, said gear set comprising a friction engaging means which is engaged to render said intermediate speed power train operative, means providing a power train between said shafts including a positive engaging means for completing the power train, said last-named power train being of substantially the same speed ratio as said intermediate speed power train and said positive engaging means being engageable when said intermediate speed power train is operative, and means for providing a high speed power train between said shafts and including said overdrive gear set, said high speed power train being completed by an engagement of said friction engaging means.

15. In a transmission, the combinition of a drive shaft, a driven shaft, means providing a low speed ratio power train between said shafts and including an underdrive gear set, means for providing a substantially one to one intermediate speed ratio power train between said shafts and including an overdrive gear set connectible in tandem with said underdrive gear set, said overdrive gear set including a friction engaging means for rendering the overdrive gear set operative and for completing said intermediate speed ratio power train, a positive clutch for coupling directly said driving and driven shafts and being engageable while said driven shaft is driven at its said intermediate speed ratio, and means for connecting said overdrive gear set with said drive shaft whereby to drive said driven shaft at an overdrive speed ratio when said friction engaging means is engaged.

16. In a transmission, the combination of a drive shaft, a driven shaft, means providing a low speed power train between said shafts and including an underdrive gear set, means providing an intermediate speed power train between said shafts which drives the driven shaft at substantially the same speed as the drive shaft and including a planetary overdrive gear set connectible in tandem with said underdrive gear set, said overdrive gear set providing substantially the same change of speed ratio as said underdrive gear set and including a friction brake which when engaged renders the overdrive gear set operative and completes said intermediate speed power train, a positive clutch for connecting directly said driving and driven shafts and being engageable when said intermediate speed power train is operative, and means for connecting said overdrive gear set with said drive shaft whereby the driven shaft may be driven at a high or overdrive speed ratio, said friction brake being engaged to establish said high speed ratio.

17. In a transmission, the combination of a drive shaft, a driven shaft, means for providing a low speed power train between said shafts and including an underdrive gear set, means for providing an intermediate speed power train between said shafts and including an overdrive gear set connectible in tandem with said underdrive gear set, said overdrive gear set comprising a friction engaging means which is engaged to render the overdrive gear set operative and to complete said intermediate speed power train, a positive clutch for connecting directly said driving and driven shafts, said overdrive gear set providing a slightly different speed ratio than said underdrive gear set whereby the driven shaft in intermediate speed drive is driven at a slightly different speed than said drive shaft whereby the positive clutch may be engaged when the intermediate speed power train is operative, and means for connecting said drive shaft and said overdrive gear set whereby to provide a high or overdrive speed power train between the shafts, said overdrive speed power train being completed by an engagement of said friction engaging means.

18. In a transmission, the combination of a drive shaft, a driven shaft, an underdrive gear set adapted to be driven by said drive shaft, an overdrive gear set connected to drive said driven shaft and comprising a friction engaging means for rendering the gear set operative, clutch means for connecting said underdrive gear set with said driven shaft, clutch means for connecting said overdrive gear set with either said underdrive gear set or with said drive shaft, and positive clutch means for directly connecting said shafts, said underdrive gear set and said overdrive gear set providing substantially the same changes in speed ratio whereby said positive clutch means may be engaged when said underdrive gear set and said overdrive gear set are connected in tandem and are simultaneously operable to drive the driven shaft.

19. In a transmission, the combination of a drive shaft, a driven shaft, an underdrive gear set driven by said drive shaft, an overdrive gear set adapted to drive said driven shaft and comprising a friction engaging means for rendering the gear set operative, clutch means for connecting said underdrive gear set and said driven shaft for driving the later at a low speed ratio, a positive clutch for connecting said underdrive gear set and said overdrive gear set in tandem in one position of the clutch and for connecting said drive shaft and said overdrive gear set in another position of the clutch, and a positive clutch for directly connecting said drive and driven shafts, said underdrive gear set and said overdrive gear set providing substantially the same changes in speed ratio whereby the gear sets when connected in tandem drive the driven shaft at substantially the same speed as the drive shaft and said last named positive clutch may then be engaged to directly couple the drive and driven shafts.

20. In a transmission, the combination of a drive shaft, a driven shaft, an underdrive gear set of the countershaft type driven by said drive shaft, an overdrive gear set of the planetary type adapted to drive the driven shaft and including a friction brake for rendering the gear set operative, a positive clutch for connecting said underdrive gear set with the driving element of said overdrive gear set in one position of the clutch and for connecting the driving element of the overdrive gear set with the drive shaft in another position of the clutch, a one-way clutch for connecting said driving element with said driven shaft whereby the underdrive gear set may drive the driven shaft when the positive clutch is in its said first-named position, said underdrive gear set and said overdrive gear sets providing substantially the same change in speed ratio whereby said driven shaft is driven at substantially the same speed as said drive shaft when the two gear sets are connected in tandem to drive said driven shaft so that said positive clutch for directly connecting said shafts may be engaged at this speed ratio provided by the two gear sets.

21. In a transmission, the combination of a drive shaft, a driven shaft, means providing a low speed power train between said shafts and including a hydrodynamic coupling device, means providing a higher speed power train between said shafts and including a gear set and a friction engaging means for rendering said gear set operative, and means for providing another power train between said shafts of substantially the same ratio as said higher speed power train and including a positive engaging means for completing the power train, said positive engaging means being engageable while said friction engaging means is operative to complete said higher speed power train.

22. In a transmission, the combination of a drive shaft, a driven shaft, means providing a low speed power train between said shafts and including a hydrodynamic coupling device, means providing a higher speed power train between said shafts and including a gear set connectible between said first-named power train and said driven shaft and including a friction engaging means for rendering the gear set operative, means for providing another power train between said shafts and being of substantially the same ratio as said higher speed power train and including a positive engaging means for completing the power train, said positive engaging means being engageable while said friction engaging means is operative to complete said higher speed power train.

23. In a transmission, the combination of a drive shaft, a driven shaft, means providing a low speed power train between said shafts and including a hydrodynamic coupling device connected in tandem with an underdrive gear set, means for providing a higher speed ratio between shafts and including an overdrive gear set connectible in tandem with said underdrive gear set and including a friction engaging means for rendering the overdrive gear set operative, said higher speed power train providing substantially a one to one drive between said drive and driven shafts, and a positive clutch for directly connecting said shafts and being engageable while said driven shaft is driven at said higher speed ratio.

24. In a transmission, the combination of a drive shaft, a driven shaft, means providing a low speed power train between said shafts and including a hydrodynamic coupling and underdrive gearing connected in tandem, means for providing an intermediate speed power train between said shafts and including a planetary overdrive gear set connectible in tandem with said coupling and underdrive gearing and including a friction brake for rendering the overdrive gear set operative, said intermediate speed power train providing substantially a one to one speed ratio between said shafts, a positive type clutch for directly connecting said drive and driven shafts and being engageable when said driven shaft is driven at said one to one speed ratio, and positive clutch means for connecting said overdrive gear set with said drive shaft whereby to provide a high or overdrive speed ratio between said shafts which is rendered operative by an engagement of said friction brake.

25. In a transmission, the combination of aligned driving and driven shafts, means providing a variable ratio power train between said shafts and including a hydrodynamic coupling device, means providing another power train between said shafts and including a friction engaging means and positive engaging means in the power train, said second named power train providing a fixed ratio between said shafts which corresponds to one of the ratios provided by said first named power train whereby said positive engaging means may be engaged to complete said second named power train while said first named power train is operative.

26. In a transmission, the combination of aligned driving and driven shafts, means providing a power train between said shafts, said means including a hydrodynamic coupling device whereby the power train provides a ratio between said shafts which is variable and increases to a certain high speed ratio, means providing another power train between said shafts and including a friction engaging means and a positive engaging means in the power train, said second named power train being completely mechanical and providing the same speed ratio as said high speed ratio provided by said first named power train, whereby said positive clutch may be engaged to complete said second named power train while said first named power train is operative to supplant said first named power train.

27. In a transmission, the combination of aligned driving and driven shafts, means providing a variable forward speed ratio power train between said shafts and including change speed gearing and a hydrodynamic coupling device, means providing another power train between said shafts and including a friction engaging means and a positive engaging means to complete the power train, said second named power train providing a fixed ratio between said shafts which corresponds to one of the ratios provided by said first named power train whereby said positive engaging means may be engaged to complete said second named power train while said first named power train is operative.

28. In a transmission, the combination of aligned driving and driven shafts, means providing a power train between said shafts, said means including change speed gearing and a hydrodynamic coupling device whereby the power train provides a forward speed ratio between said shafts which is variable and increases to a certain forward high speed ratio, means providing another power train between said shafts and including a friction engaging means and a positive clutch for completing the power train, said second named power train being completely mechanical and providing the same forward speed ratio as said high speed forward ratio provided by said first named power train, whereby said positive clutch may be engaged to complete said second named power train while said first named power train is operative to supplant said first named power train.

BENJAMIN A. SWENNES.

REFERENCES CITED

The following references are of record in the file of this patent:

UNITED STATES PATENTS

| Number | Name | Date |
|---|---|---|
| 1,759,558 | Jacobs | May 20, 1930 |
| 2,011,734 | Sinclair | Aug. 20, 1935 |
| 2,113,088 | Jonsson | Apr. 5, 1938 |
| 2,135,042 | Rossman | Nov. 1, 1938 |
| 2,146,369 | Dodge | Feb. 7, 1939 |
| 2,170,649 | Banker | Aug. 22, 1939 |
| 2,177,951 | Simpson | Oct. 31, 1939 |
| 2,177,952 | Snow | Oct. 31, 1939 |
| 2,259,732 | Burtnet | Oct. 21, 1941 |
| 2,342,960 | Neracher | Feb. 29, 1944 |
| 2,343,312 | Maurer | Mar. 7, 1944 |
| 2,399,709 | Schjolin | May 7, 1946 |
| 2,400,539 | Chilton | May 21, 1946 |
| 2,400,540 | Chilton | May 21, 1946 |

FOREIGN PATENTS

| Number | Country | Date |
|---|---|---|
| 297,793 | Great Britain | Feb. 21, 1929 |
| 309,134 | Great Britain | Oct. 31, 1929 |